US007610046B2

(12) United States Patent  (10) Patent No.: US 7,610,046 B2
Wala  (45) Date of Patent: Oct. 27, 2009

(54) SYSTEM AND METHOD FOR ENHANCING THE PERFORMANCE OF WIDEBAND DIGITAL RF TRANSPORT SYSTEMS

(75) Inventor: Philip M. Wala, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 613 days.

(21) Appl. No.: 11/398,879

(22) Filed: Apr. 6, 2006

(65) Prior Publication Data

US 2007/0238457 A1  Oct. 11, 2007

(51) Int. Cl.
 *H04W 24/00* (2006.01)
(52) U.S. Cl. ............... 455/424; 455/450; 455/509; 455/502; 370/347; 375/257
(58) Field of Classification Search ............ 455/424, 455/560–562.1, 131, 323, 334, 502, 450–453, 455/509; 370/395.21, 468, 310, 347, 350, 370/304, 320, 329; 398/334, 58, 69, 115; 375/257, 240
See application file for complete search history.

(56) References Cited

U.S. PATENT DOCUMENTS

| 4,183,054 A | 1/1980 | Patisaul et al. |
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |
| 5,627,879 A | 5/1997 | Russell et al. |
| 5,818,883 A | 10/1998 | Smith et al. |
| 5,898,693 A | 4/1999 | Vecchi et al. |
| 7,050,419 B2* | 5/2006 | Azenkot et al. ............. 370/347 |
| 7,068,679 B1* | 6/2006 | Brown et al. ................ 370/468 |
| 7,209,455 B2* | 4/2007 | Yee et al. ................. 370/310.1 |
| 7,417,946 B2* | 8/2008 | Kim et al. ................... 370/208 |

(Continued)

FOREIGN PATENT DOCUMENTS

EP  0391597  10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner*—Kamran Afshar
(74) *Attorney, Agent, or Firm*—Fogg & Powers LLC

(57) ABSTRACT

A system and method for enhancing the performance of wideband digital RF transport systems is disclosed, which enables the transport of different bandwidth segments on a plurality of wideband channels by selecting an optimal clock sample rate for each bandwidth segment to be transported. Thus, the bandwidth segments are proportionally allocated so that an optimum amount of bandwidth can be transported at the serial bit rate.

19 Claims, 2 Drawing Sheets

U.S. PATENT DOCUMENTS

| | | | |
|---|---|---|---|
| 2002/0163937 A1 | 11/2002 | Svacek et al. | |
| 2004/0101303 A1* | 5/2004 | Williams | 398/58 |
| 2004/0132474 A1 | 7/2004 | Wala | |
| 2005/0010958 A1* | 1/2005 | Rakib et al. | 725/111 |
| 2006/0121944 A1* | 6/2006 | Buscaglia et al. | 455/561 |
| 2007/0071033 A1* | 3/2007 | Surek et al. | 370/474 |
| 2008/0240225 A1* | 10/2008 | Zavadsky et al. | 375/240 |

FOREIGN PATENT DOCUMENTS

| | | |
|---|---|---|
| EP | 0687084 | 12/1995 |
| WO | 9115927 | 10/1991 |
| WO | 0233969 | 4/2002 |
| WO | 2004070582 | 8/2004 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

SYSTEM AND METHOD FOR ENHANCING THE PERFORMANCE OF WIDEBAND DIGITAL RF TRANSPORT SYSTEMS

FIELD OF THE INVENTION

The present invention relates generally to the telecommunications field, and more specifically, but not exclusively, to a system and method for enhancing the performance of wideband digital Radio Frequency (RF) transport systems.

BACKGROUND OF THE INVENTION

In wireless voice and data communications, the digital transport of RF signals over long distances via fiber optic cables provides enhanced capacity, and higher performance distributed coverage than existing analog RF transport systems currently being used. An example of such a digital RF transport system that links a digital host unit to one or more digital remote units to perform bi-directional simultaneous digital RF distribution is disclosed in U.S. Patent Application Publication No. 2004/0132474 A1, entitled "POINT-TO-MULTIPOINT DIGITAL RADIO FREQUENCY TRANSPORT", which is assigned to ADC Telecommunications, Inc. of Eden Prairie, Minn. and incorporated herein in its entirety.

Notwithstanding the advantages of today's digital RF transport systems over other types of RF transport systems, a significant problem exists in the transport of large amounts of digital RF bandwidth (e.g., wideband). For example, the existing wideband digital RF transport systems combine multiple digitized signals and convey them in serialized form on a common physical layer between the transmit and receive devices involved. However, the problem with the existing digital RF transport systems is that they inefficiently transport equal amounts of bandwidth for different wideband channels. In other words, the serial bit streams on the transport layer that convey N wideband channels are all tied to one sample rate, and the system transport spectrum (RF) is sent point-to-point in equal bandwidth segments (e.g., 25 MHz blocks). Consequently, since many of the wideband channels have bandwidth requirements that are less (or different) than 25 MHz (e.g., 5 MHz, 10 MHz, 30 MHz, etc.), the overall bandwidths of existing wideband digital RF transport systems are substantially underutilized. Therefore, a pressing need exists for a system and method that can enhance the performance of wideband digital RF transport systems, by maximizing the utilization of the transport bandwidth, custom tailoring the bandwidth allocations to specific user needs on a common platform, and enabling the use of lower cost transport system devices. As described in detail below, the present invention provides such a system and method, which resolves the above-described bandwidth underutilization problems and other related problems.

SUMMARY OF THE INVENTION

The present invention provides a system and method for enhancing the performance of wideband digital RF transport systems, which enables the transport of different bandwidth segments on a plurality of wideband channels by selecting an optimal clock sample rate for each bandwidth segment to be transported. Thus, the present invention allocates the bandwidth segments proportionally so that an optimum amount of bandwidth can be transported at the serial bit rate. In accordance with a preferred embodiment of the present invention, a system for enhancing the performance of a wideband digital RF transport system is provided, which includes a transmit unit, a receive unit, and an optical transmission medium connected between the transmit unit and the receive unit. The transmit unit includes a plurality of wideband RF analog signal inputs coupled to a plurality of analog-to-digital, digital down-converter (A/D DDC) devices. Notably, the sample rate of each A/D DDC device is determined by a respective sample clock. The digitized wideband RF signal segments at the outputs of the A/D DDC devices are combined and converted to a frame structure, converted to serial form, and transmitted on the optical transmission medium to the receive unit. A light detection device in the receive unit detects the serial bit stream of frames on the optical transmission medium, the serialized frames are converted back to the original frame format, and the original digitized wideband RF segments are reconstructed. Each digitized wideband RF segment is coupled to a respective D/A digital up-converter (D/A DUC) device associated with a particular wideband RF signal input on the transmit side. Notably, the output sample rate of each D/A DUC device is determined by a respective sample clock, which provides the same sample rate as that of the associated A/D DDC device in the transmit unit. The sample rate of each A/D DDC device (and associated D/A DUC device) is pre-selected so that the transmission medium can transport the optimum amount of RF bandwidth at the given serial bit rate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawing(s), wherein:

DETAILED DESCRIPTION OF PREFERRED EMBODIMENT

Figure 1:
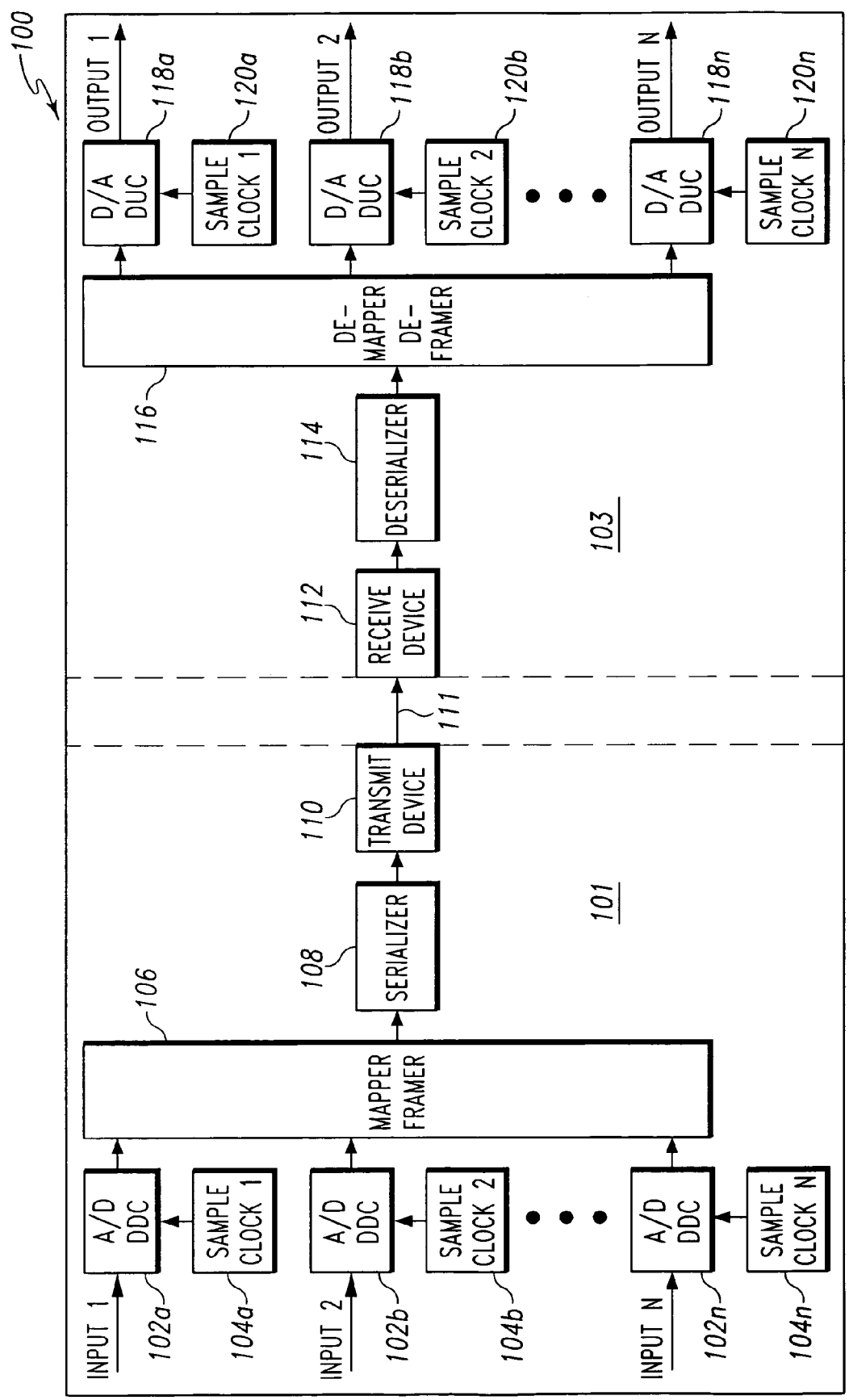
FIG. 1 depicts a schematic block diagram of an example system for enhancing the performance of wideband digital RF transport systems, which can be used to implement a preferred embodiment of the present invention.

With reference now to the figures, FIG. 1 depicts a schematic block diagram of an example system 100 for enhancing the performance of wideband digital RF transport systems, which can be used to implement a preferred embodiment of the present invention. System 100 includes a first communications unit 101, a second communications unit 103, and a transmission (transport) medium 111 connected between first communications unit 101 and second communications unit 103. For this example embodiment, first communications unit 101 is a wideband digital RF transmit unit, second communications unit 103 is a wideband digital RF receive unit, and transmission medium 111 is a single mode (or multi-mode) fiber optic cable. Although system 100 is depicted for illustrative purposes as a unidirectional communications system, the scope of coverage of the present invention is not intended to be so limited, and system 100 could also be implemented as a bi-directional communications system (e.g., using a transceiver on each side). Also, for this illustrative example, system 100 may be implemented as a point-to-point digital RF transport system for cellular radiotelephone voice and data communications, with a digital host unit (first communications unit 101) that provides an interface between a plurality of base station RF ports and the fiber optic cable, and a digital remote unit (second communications unit 103) that provides an interface between the fiber optic cable and a remote antenna. Additionally, although the transmission medium 111 is described as an optical transmission medium for this illustrative embodiment, the present invention is not intended to be so limited and can include within its scope any suitable transmission medium (e.g., millimeter wave radio link, microwave radio link, satellite radio link, infrared wireless link, coaxial cable, etc.) capable of transporting a serial bit stream.

For this example embodiment, first communications unit 101 includes a plurality of input interfaces 102a-102n. Each input interface 102a-102n is implemented with an A/D DDC device, for this illustrative embodiment. An input of each A/D DDC device 102a-102n couples a respective analog frequency band (or channel) into the associated A/D DDC device. For example, each A/D DDC device 102a-102n can accept an input analog frequency band (e.g., frequency band from a base transceiver station) at a relatively high rate, and digitizes and down-converts the respective frequency band to suitable digital real and complex (e.g., I/Q) baseband signals. For example, the output from each A/D converter section of an A/D DDC device 102a-102n can be a sequence of real samples, representing a real (positive frequency) signal within a designated Nyquist zone. The output from each DDC section can be a baseband signal (centered at zero Hz) with positive and negative frequencies, composed of two sample streams (real and imaginary components) with each stream at one half the sample rate of the equivalent real-valued signal.

Notably, in the example embodiment depicted in FIG. 1, the input interfaces 102a-102n to communications unit 101 are implemented with a plurality of A/D DDC devices that can accept a plurality of analog RF bandwidths, but the present invention is not intended to be so limited. In other embodiments, the input interfaces can be implemented with other types of input devices to accept other types of bandwidths. For example, in order to accept a plurality of RF inputs, each input interface device 102a-102n can be implemented with a single A/D converter (no DDC) operating at IF (e.g., real digital output), dual A/D converters (no DDC) operating at baseband (e.g., complex I/Q digital output), or single or dual A/D converters operating at a high sample rate and followed by digital down-conversion (DDC) whereby the output is a lower sample rate representation (complex I/Q) of a portion of the original band. In another embodiment, each input interface device 102a-102n can be implemented by a direct digital input (typically baseband I/Q) from a digital or "software-defined" base station. In sum, the plurality of input interfaces 102a-102n can be implemented with any suitable input interface device(s) capable of accepting or inputting analog or digital wideband segments.

For this example embodiment, each A/D DDC device 102a-102n can be implemented as part of a modular (e.g., pluggable) RF card capable of adjustable bandwidth selection that can be determined by user requirements. For example, in one embodiment, each A/D DDC device 102a-102n can be implemented as part of an RF card that passes 5 MHz bandwidth segments. Notably, the sample rate of each A/D DDC device 102a-102n is determined by an associated sample clock 104a-104n. Therefore, by selecting a suitable sample rate for each A/D DDC device 102a-102n, the present invention provides the ability to custom tailor the bandwidth allocations to specific user needs on the common transport platform being used.

For example, one or more users may desire to transport a combination of one 5 MHz segment and three 15 MHz segments from a digital host unit (e.g., first communications unit 101) to a digital remote unit (e.g., second communications unit 103) via a fiber optic cable (e.g., transmission medium 111). For a given serial bit rate on the fiber optic cable, a suitable sample rate may be selected for the sample clock 104a-104n associated with each A/D DDC device 102a-102n to be used. For this example, assume that the 5 MHz segment is to be input to A/D DDC device 102a, and each of A/D DDC devices 102b, 102c and 102d (where "n" in this case is equal to 4) is designed to accept a respective one of the three 15 MHz segments to be transported. The sample rate for sample clock 104a is selected to accommodate the transport of the 5 MHz segment (band) at the given serial bit rate, and the sample rates for sample clocks 104b-104d are selected to accommodate the transport of the respective 15 MHz segments at the given serial bit rate. In a practical application, the sample rates (e.g., approximately 45 Msps) of sample clocks 104b-104d are typically three times the sample rate of sample clock 104a (e.g., approximately 15 Msps) for a given serial bit rate on a fiber optic cable. In any event it should be readily understood that the present invention is not intended to be limited to a particular set of clock sample rates, the size of a frequency band that can be accepted by a specific A/D DDC device, the size of the frequency bands to be transported, or the serial bit rate for the optical transmission medium to be used.

For example, a suitable clock sample rate can be selected to accommodate the transport of a 75 MHz segment (e.g., at 15 times the clock sample rate used for a 5 MHz segment) from the input of a particular A/D DDC device via a fiber optic cable at a specific serial bit rate. As another example, assume that each A/D DDC device 102a-102n is designed to process a 10 MHz band of frequencies. In this case, a suitable sample rate for each sample clock can be selected to accommodate the transport of a 10 MHz band and/or a band that is a multiple of 10 MHz (e.g., 30 MHz band at three times the sample rate of the sample rate used for the 10 MHz band). In other words, the present invention enables a user to transport just the required amount of bandwidth at the serial bit rate of the transmission medium to be used.

For this example embodiment, the digitized output of each A/D DDC device 102a-102n is coupled to a mapper/framer device 106. Essentially, the mapper section of mapper/framer device 106 multiplexes together the digitized bands at the outputs of the plurality of A/D DDC devices 102a-102n, and the framer section of mapper/framer device 106 converts the multiplexed digitized bands into a suitable frame structure format. For example, in a practical application, the mapper/framer device 106 can construct a suitable frame structure that provides up to twelve (e.g., 5 MHz) slots per frame. However, it should be understood that the present invention is not intended to be limited to a specific number of slots per frame, and any suitable number of slots per frame may be used. In any event, the frame(s) containing the multiplexed band segments are coupled from mapper/framer device 106 to a serializer device 108, which converts the parallel frame data from the mapper/framer device 106 to a serial bit stream. The serial data from serializer device 108 is coupled to an optical transmit device 110. The optical transmit device 110 processes and translates that data into coded light pulses that form a serial bit stream. An injection-laser diode or other suitable light source generates the light pulses, which are funneled with suitable optical lenses into the optical transmission medium (e.g., fiber optic cable) 111. For example, optical transmission medium 111 can be a single mode or multi-mode fiber optic cable. Notably, an optical transport medium is used for this illustrative embodiment, but the present invention is not intended to be so limited and can include within its scope of coverage any suitable transport medium that can convey a serial bit stream.

For this example embodiment, second communications unit 103 includes a receive device 112, which includes a light sensitive device that detects the pulsed light signals (e.g., serial bit stream of frames) on transmission medium 111, converts the light signals to digital signals, and conveys them in serial form to a deserializer device 114. Again, it should be understood that although a light sensitive device is used for this illustrative embodiment, the present invention is not intended to be so limited and can include within its scope of coverage any suitable device that can receive and/or detect a serial bit stream from the particular transport medium being used. Deserializer device 114 converts the serial frame data from receive device 112 to parallel frame data, which is coupled to a demapper/deframer device 116. Essentially, demapper/deframer device 116 demultiplexes the parallel frame data, and extracts the bandwidth segments from the demultiplexed frames. The extracted bandwidth segments are coupled to the inputs of the appropriate output interfaces 118a-118n. For this illustrative embodiment, each output interface 118a-118n is implemented with a digital-to-analog (D/A) digital up-converter (D/A DUC) device. Each D/A DUC device 118a-118n converts the complex digital baseband signal to a real passband signal. For example, each digital baseband signal can be filtered, converted to the appropriate sampling rate by a respective sample clock 120a-120n, upconverted to an appropriate frequency, and modulated onto an analog signal. For this example embodiment, the sample rate of each sample clock 120a-120n is selected to be the same as the sample rate of the corresponding sample clock 104a-104n in first communications unit 101. Thus, the analog bandwidth segments input to first communications unit 101 are transported via optical transmission medium 111 as a serial bit stream, and reconstructed at the corresponding output in second communications unit 103.

Notably, in the example embodiment depicted in FIG. 1, the output interfaces 102a-102n of communications unit 103 are implemented with a plurality of D/A DUC devices that can output a plurality of analog RF bandwidths, but the present invention is not intended to be so limited. In other embodiments, the output interfaces can be implemented with other types of output devices for other types of bandwidths. For example, in a second embodiment, in order to process a real digital signal at its input, each output interface 118a-118n can be implemented with a single D/A converter and analog up-conversion. In another embodiment, in order to process a complex digital signal at its input, each output interface 118a-118n can be implemented with dual D/A converters and analog up-conversion, or a DUC (e.g., digital up-conversion) and dual D/A converters. In sum, the plurality of output interfaces 118a-118n can be implemented with any suitable output interface device(s) capable of outputting analog or digital wideband segments.

Figure 2:
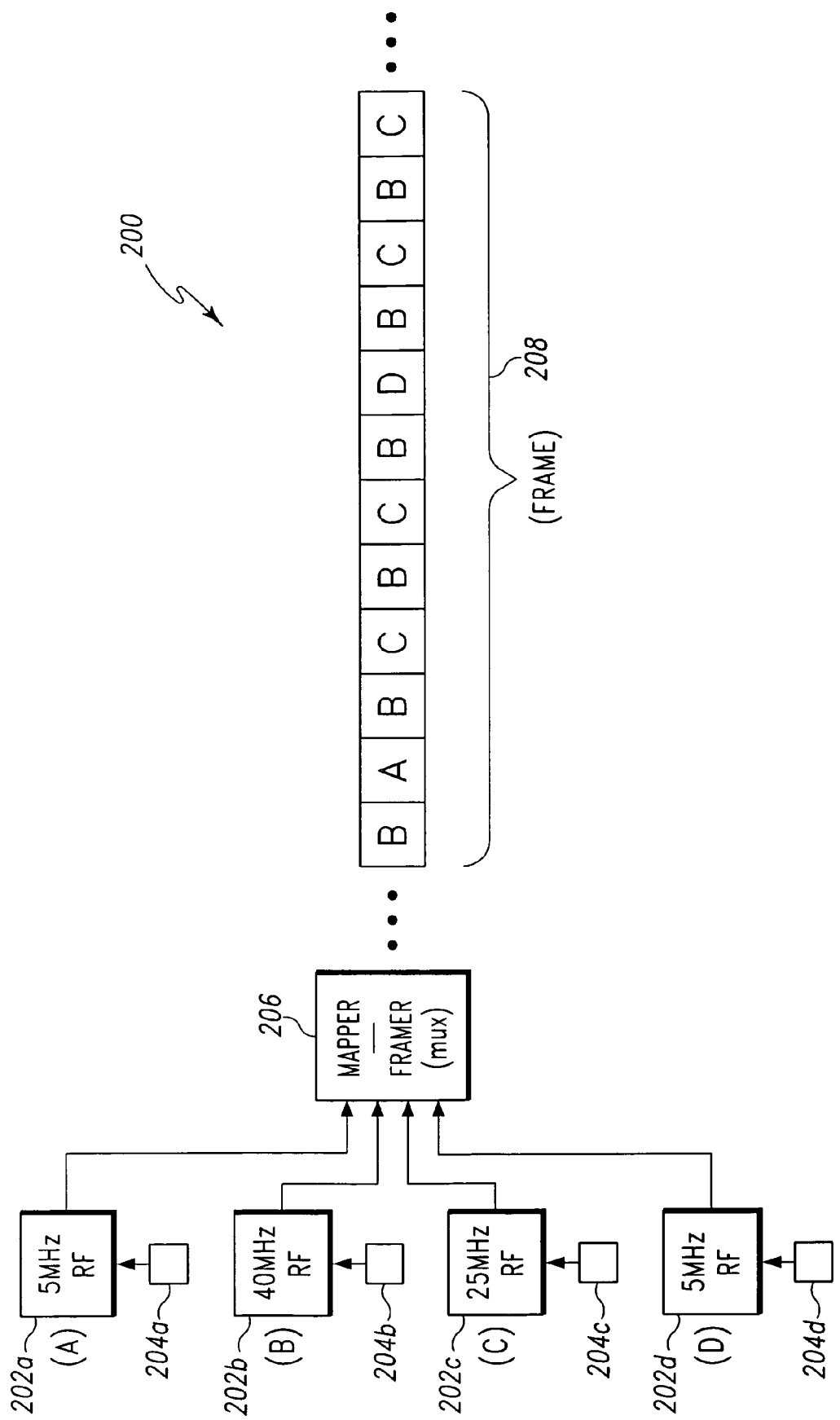
FIG. 2 depicts a pictorial representation of an example frame structure, which illustrates key principles of the present invention.

FIG. 2 depicts a pictorial representation of an example frame structure 200, which illustrates key principles of the present invention. Essentially, the frame structure 200 shown in FIG. 2 illustrates how the present invention allocates bandwidth proportionally, which allows a user to maximize the amount of bandwidth that can be transported on the serial bit stream. As such, the present invention enables users to transport different bandwidths efficiently on a plurality of wideband channels, instead of having to transport equal amounts of bandwidth inefficiently on those channels.

Specifically, referring to this illustrative example, it may be assumed that four different bandwidths are to be transported by system 100 depicted in FIG. 1. As such, for this example, bandwidth A (5 MHz RF) is input to A/D DDC device 202a, bandwidth B (40 MHz RF) is input to A/D DDC device 202b, bandwidth C (25 MHz RF) is input to A/D DDC device 202c, and bandwidth D (5 MHz RF) is input to A/D DDC device 202d. A respective sample clock 204a-204d inputs a unique sample rate to the associated A/D DDC device 202a-202d. The outputs from A/D devices 202a-202d are coupled to a mapper/framer device 206 and a serializer device (not shown), which multiplexes or combines the separate bandwidth segments (A, B, C, D) and constructs a suitable frame 208 including the bandwidth segments for transport. For this example frame structure, assume that the frame rate is approximately 15 MHz, and each of the frame's 12 slots includes 16 bits of digitized RF (with 14 bits of payload). The sample rate of sample clock 204a is selected to be approximately 15 Msps (for 5 MHz bandwidth segments), approximately 90 Msps for sample clock 204b (for 40 MHz bandwidth segments), approximately 60 Msps for sample clock 204c (for 25 MHz bandwidth segments), and approximately 15 Msps for sample clock 204d (for 5 MHz bandwidth segments). Thus, as illustrated by this example, the bandwidths in frame 208 are allocated proportionally, by transporting one slot for bandwidth A (5 MHz), six slots for bandwidth B (40 MHz), four slots for bandwidth C (25 MHz), and one slot for bandwidth D (5 MHz).

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for enhancing the performance of a wideband digital RF transport system, comprising:
   a plurality of bandwidth input interface devices;
   a mapper/framer device, an output of each bandwidth input interface device coupled to an input of said mapper/framer device; and
   a plurality of sample rate devices individually coupled to said plurality of bandwidth input interface devices wherein the plurality of sample rate devices comprises a plurality of sample clocks, each sample rate device of said plurality of sample rate devices adapted to individually set an input sample rate of an associated bandwidth input interface device.

2. The system of claim 1, further comprising:
   a serializer device coupled to an output of said mapper/framer device;
   a transmit device coupled to an output of said serializer device; and
   a transmission medium coupled to an output of said transmit device.

3. The system of claim 1, wherein said plurality of bandwidth input interface devices comprises a plurality of analog-to-digital digital down-converters.

4. The system of claim 2, wherein said transmit device comprises a laser transmitter device, and said transmission medium comprises a fiber optic cable.

5. The system of claim 2, further comprising:
a digital signal detection device coupled to said transmission medium;
a deserializer device coupled to an output of said digital signal detection device;
a demapper/deframer device coupled to an output of said deserializer device;
a plurality of output interface devices, an input of each output interface device of said plurality of output interface devices coupled to a respective output of said demapper/deframer device; and
a plurality of sample clock devices, each sample clock device adapted to set an output sample rate of an associated output interface device of said plurality of output interface devices.

6. A system for enhancing the performance of a wideband digital RF transport system, comprising:
means for inputting a plurality of bandwidths;
means for setting a plurality of input sample rates coupled to said means for inputting said plurality of bandwidths;
means for combining said plurality of bandwidths;
means for constructing at least one frame including said combined plurality of bandwidths;
means for converting said at least one frame to a serial form;
means for generating a signal including said at least one frame in serial form;
means for transporting said signal, coupled to an output of said means for generating;
means for detecting said at least one frame from said signal, coupled to said means for transporting;
means for converting said detected at least one frame to a parallel form;
means for deconstructing said at least one frame to produce said combined plurality of bandwidths;
means for separating said combined plurality of bandwidths;
means for converting said plurality of bandwidths to a second plurality of bandwidths; and
means for setting an output sample rate for each bandwidth of said second plurality of bandwidths.

7. The system of claim 6, wherein said means for inputting a plurality of bandwidths comprises a plurality of analog-to-digital digital down-converters, and said means for setting a plurality of input sample rates comprises a plurality of sample clocks.

8. The system of claim 6, wherein said means for combining said plurality of bandwidths comprises a mapper device.

9. The system of claim 6, wherein said means for generating a signal comprises a millimeter wave radio transmitter device.

10. The system of claim 6, wherein said means for generating a signal comprises a wireless transmitter device.

11. The system of claim 6, wherein said means for generating a signal comprises a laser transmitter device.

12. The system of claim 6, wherein said means for transporting said signal comprises a fiber optic cable.

13. The system of claim 6, wherein said means for detecting said at least one frame from said signal comprises a photo-detector device.

14. The system of claim 6, wherein said means for converting said plurality of bandwidths to a second plurality of bandwidths comprises a plurality of digital-to-analog digital up-converter devices, and said means for setting an output sample rate for each bandwidth of said plurality of bandwidths comprises a plurality of sample clocks.

15. A method for enhancing the performance of a wideband digital RF transport system, comprising the steps of:
inputting a plurality of bandwidths; and
setting a unique input sample rate for each bandwidth of said plurality of input bandwidths;
combining said plurality of bandwidths;
converting said combined plurality of bandwidths to at least one frame structure;
converting said at least one frame structure to a serial form;
converting said at least one frame structure in serial form to a plurality of coded signals; and
transporting said plurality of coded signals on a transmission medium.

16. The method of claim 15, further comprising the steps of:
detecting said at least one frame from said plurality of coded signals;
converting said detected at least one frame to a parallel form;
deconstructing said at least one frame to produce said combined plurality of bandwidths;
separating said combined plurality of bandwidths;
converting said plurality of bandwidths to a second plurality of bandwidths; and
setting an output sample rate for each bandwidth of said second plurality of bandwidths.

17. The method of claim 15, wherein the inputting step is performed by a plurality of input interface devices, and the setting step is performed by a first plurality of sample clock devices.

18. The method of claim 16, wherein the step of converting said plurality of bandwidths to a second plurality of bandwidths is performed by a plurality of output interface devices.

19. The method of claim 16, wherein the step of setting an output sample rate is performed by a second plurality of sample clock devices.

* * * * *

UNITED STATES PATENT AND TRADEMARK OFFICE
CERTIFICATE OF CORRECTION

PATENT NO. : 7,610,046 B2
APPLICATION NO. : 11/398879
DATED : October 27, 2009
INVENTOR(S) : Philip M. Wala It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Twelfth Day of October, 2010

David J. Kappos
*Director of the United States Patent and Trademark Office*